(12) United States Patent
Fehr et al.

(10) Patent No.: US 11,653,766 B1
(45) Date of Patent: May 23, 2023

(54) ADJUSTABLE ARMREST MOUSE PAD

(71) Applicant: CKnapp Sales, Inc., Goodfield, IL (US)

(72) Inventors: Micah Fehr, Danvers, IL (US); Nicholas Welander, East Peoria, IL (US); Jakob Douglas, Washington, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 177 days.

(21) Appl. No.: 17/325,172

(22) Filed: May 19, 2021

Related U.S. Application Data

(63) Continuation-in-part of application No. 29/784,500, filed on May 19, 2021.

(51) Int. Cl.
*A47C 7/68* (2006.01)
*G06F 3/039* (2013.01)

(52) U.S. Cl.
CPC ............ *A47C 7/705* (2018.08); *G06F 3/0395* (2013.01)

(58) Field of Classification Search
CPC .............................. A47C 7/705; G06F 3/0395
USPC ........ 248/118, 118.1, 118.3, 118.5; 108/137, 108/143, 50.14, 43; 297/188.18, 188.2, 297/188.21, 188.14
See application file for complete search history.

(56) References Cited

U.S. PATENT DOCUMENTS

| | | | |
|---|---|---|---|
| 5,505,412 | A | 4/1996 | Hamme |
| 5,727,759 | A | 3/1998 | Christensen |
| 6,070,838 | A * | 6/2000 | Luginsland ........ A47B 21/0371 248/118.5 |
| 6,220,658 | B1 | 4/2001 | Lukawski et al. |
| 6,264,150 | B1 | 7/2001 | Kolenchuk |

(Continued)

FOREIGN PATENT DOCUMENTS

| | | | |
|---|---|---|---|
| CA | 2316522 A1 * | 2/2001 | ............... A47C 7/68 |
| CN | 213491209 U * | 6/2021 | |

(Continued)

OTHER PUBLICATIONS

Clamp-on Arm Rest and Mouse Pad: Instruction Manual, VIVO, Goodfield, Illinois, Sep. 18, 2020.

*Primary Examiner* — Kimberly T Wood
(74) *Attorney, Agent, or Firm* — Lund IP, PLLC

(57) ABSTRACT

An assembly includes a mouse pad platform forming an upper mouse pad platform surface suitable for operating a computer mouse, an armrest platform forming an upper armrest platform surface suitable for supporting a forearm of a user while operating the computer mouse, an adjustment plate fixedly coupled to an underside of the mouse pad platform and an underside of the armrest platform, thereby connecting the mouse pad platform and the armrest platform, and strap mounts on at least two of the mouse pad platform, the armrest platform, and the adjustment plate, the strap mounts being suitable to couple straps to the at least two of the mouse pad platform, the armrest platform, and the adjustment plate. The adjustment plate is selectively positionable along the underside of the mouse pad platform and selectively positionable along the underside of the armrest platform allowing adjustable spacing between the mouse pad platform and the armrest platform.

20 Claims, 13 Drawing Sheets

(56) References Cited

U.S. PATENT DOCUMENTS

| | | | |
|---|---|---|---|
| 6,352,303 B1 * | 3/2002 | Hope | A47C 7/68 |
| | | | 297/188.21 |
| 6,357,703 B1 | 3/2002 | Diorio | |
| 6,648,282 B1 * | 11/2003 | Sykes | G06F 3/0395 |
| | | | 248/444 |
| 6,851,754 B2 | 2/2005 | Bremner | |
| 7,131,688 B2 | 11/2006 | Steenson | |
| 7,360,829 B2 | 4/2008 | Bufkin | |
| 7,367,618 B2 * | 5/2008 | Rossini | A47B 83/02 |
| | | | 297/188.17 |
| 7,703,724 B2 | 4/2010 | Dalecki et al. | |
| 7,862,111 B2 * | 1/2011 | Steenson | A47B 21/0314 |
| | | | 297/188.2 |
| 8,079,553 B1 | 12/2011 | Martin | |
| 8,333,429 B2 | 12/2012 | Nelson et al. | |
| 8,777,307 B2 | 7/2014 | Nelson et al. | |
| 2002/0145019 A1 * | 10/2002 | Ulibarri | B42D 5/005 |
| | | | 224/267 |
| 2002/0179781 A1 * | 12/2002 | Timm | G06F 3/0395 |
| | | | 248/118 |
| 2003/0084828 A1 * | 5/2003 | Gillis | A47B 21/0314 |
| | | | 108/137 |
| 2005/0134097 A1 | 6/2005 | Su | |
| 2006/0061155 A1 * | 3/2006 | Steenson | A47C 7/705 |
| | | | 297/188.14 |
| 2006/0108841 A1 | 5/2006 | Steenson | |
| 2007/0284487 A1 | 12/2007 | Dalecki | |
| 2009/0108641 A1 * | 4/2009 | Steenson | A47B 21/0314 |
| | | | 297/161 |
| 2009/0301360 A1 * | 12/2009 | Copeland | G06F 3/021 |
| | | | 108/68 |
| 2022/0151375 A1 * | 5/2022 | Fehr | A47B 21/0314 |

FOREIGN PATENT DOCUMENTS

| | | |
|---|---|---|
| KR | 100458196 B1 * | 11/2004 |
| KR | 200382061 Y1 * | 4/2005 |
| KR | 20070117813 A * | 12/2007 |

\* cited by examiner

ADJUSTABLE ARMREST MOUSE PAD

CROSS REFERENCE TO RELATED APPLICATION

This application is a continuation-in-part application of U.S. patent application Ser. No. 29/784,500, titled ARMREST MOUSE PAD, filed May 19, 2021, the entire content of which is incorporated by reference herein.

TECHNICAL FIELD

This disclosure relates to furniture.

BACKGROUND

Armrest mouse pads allow a user to operate a computer mouse while resting their arm on an armrest attached to a chair arm or a desk.

BRIEF SUMMARY

As disclosed herein, an adjustable armrest mouse pad includes an armrest, a separate mouse pad platform and an adjustment plate bridging the armrest and the mouse pad platform. The design allows a user to select spacing between the armrest and the mouse pad platform to best fit their arm length and chair. The multi-part design also facilitates compact packaging compared to armrest mouse pads formed as a unitary structure as the unassembled length is less than the assembled length.

In one example, an assembly includes a mouse pad platform forming an upper mouse pad platform surface suitable for operating a computer mouse, an armrest platform forming an upper armrest platform surface suitable for supporting a forearm of a user while operating the computer mouse, an adjustment plate fixedly coupled to an underside of the mouse pad platform and an underside of the armrest platform, thereby connecting the mouse pad platform and the armrest platform, and strap mounts on at least two of the mouse pad platform, the armrest platform, and the adjustment plate, the strap mounts being suitable to couple straps to the at least two of the mouse pad platform, the armrest platform, and the adjustment plate. The adjustment plate is selectively positionable along the underside of the mouse pad platform and selectively positionable along the underside of the armrest platform allowing adjustable spacing between the mouse pad platform and the armrest platform.

In another example, an adjustable mouse pad and armrest kit includes a mouse pad platform forming an upper mouse pad platform surface suitable for operating a computer mouse, an armrest platform forming an upper armrest platform surface suitable for supporting a forearm of a user while operating the computer mouse, an adjustment plate configured to fixedly coupled to an underside of the mouse pad platform and an underside of the armrest platform, thereby connecting the mouse pad platform and the armrest platform, and strap mounts suitable to couple straps to at least two of the mouse pad platform, the armrest platform, and the adjustment plate. The adjustment plate is selectively positionable along the underside of the mouse pad platform and selectively positionable along the underside of the armrest platform allowing adjustable spacing between the mouse pad platform and the armrest platform.

A further example is directed to a method of installing an adjustable armrest mouse pad on an arm of a desk chair. The adjustable armrest mouse pad includes a mouse pad platform forming an upper mouse pad platform surface suitable for operating a computer mouse, an armrest platform forming an upper armrest platform surface suitable for supporting a forearm of a user while operating the computer mouse, an adjustment plate fixedly coupled to an underside of the mouse pad platform and an underside of the armrest platform, thereby connecting the mouse pad platform and the armrest platform, strap mounts on at least two of the mouse pad platform, the armrest platform, and the adjustment plate, the strap mounts being suitable to couple straps to the at least two of the mouse pad platform, the armrest platform, and the adjustment plate, and at least two straps. The adjustment plate is selectively positionable along the underside of the mouse pad platform and selectively positionable along the underside of the armrest platform allowing adjustable spacing between the mouse pad platform and the armrest platform. The method includes selecting a preferred spacing between the mouse pad platform and the armrest platform, securing the adjustment plate to the mouse pad platform and the armrest platform with the preferred spacing between the mouse pad platform and the armrest platform, selecting strap mounts on at least two of the mouse pad platform, the armrest platform, and the adjustment plate, coupling the straps to the selected strap mounts on at least two of the mouse pad platform, the armrest platform, and the adjustment plate, and strapping the adjustable armrest mouse pad to the arm of the desk chair with the straps.

DETAILED DESCRIPTION

Figure 1A:
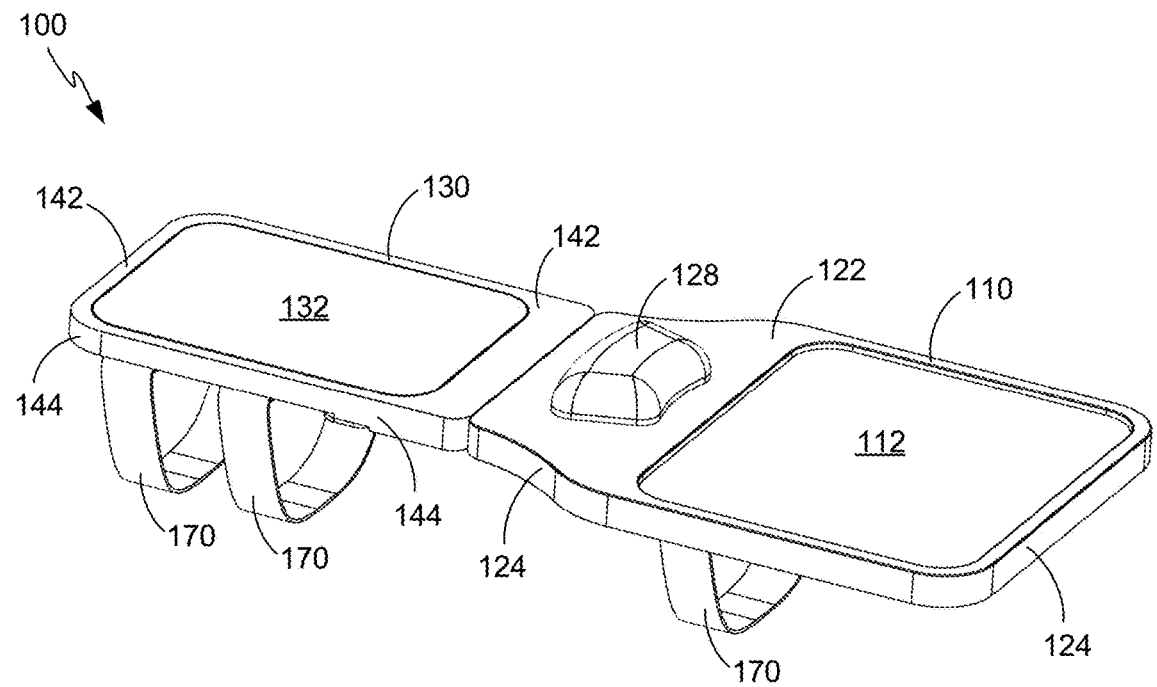
FIGS. 1A-1F illustrate components of an adjustable armrest mouse pad including an armrest, a separate mouse pad, and an adjustment plate bridging the armrest and the mouse pad with straps for attachment to an arm of a desk chair.
Figure 1B:
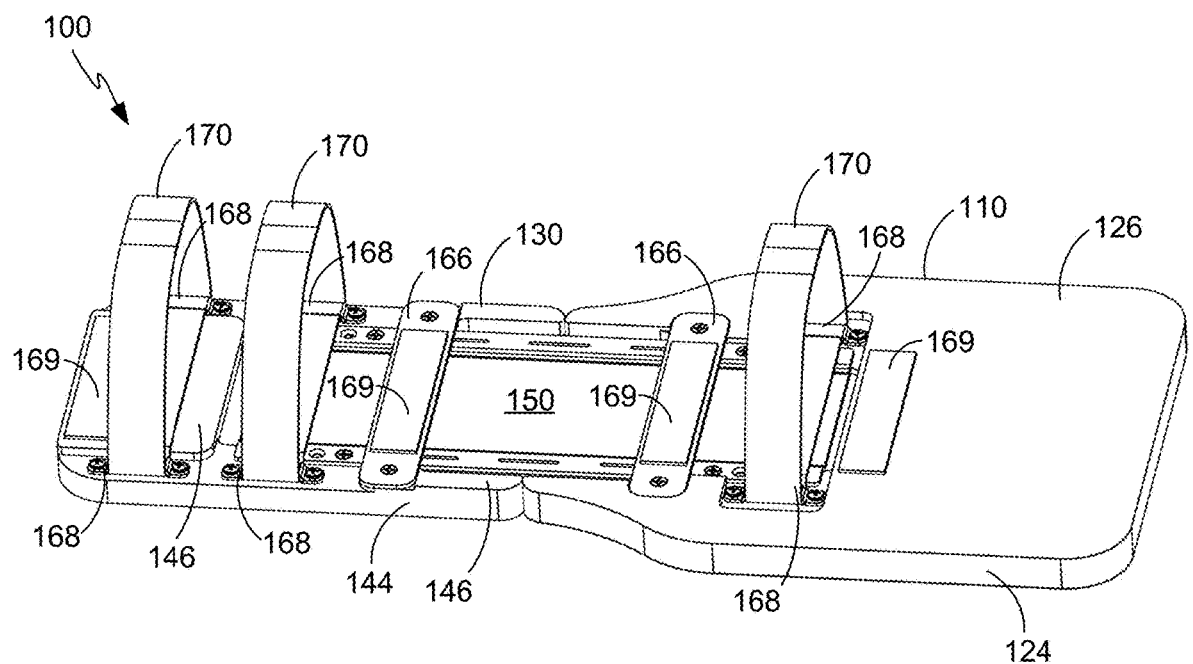
Figure 1C:
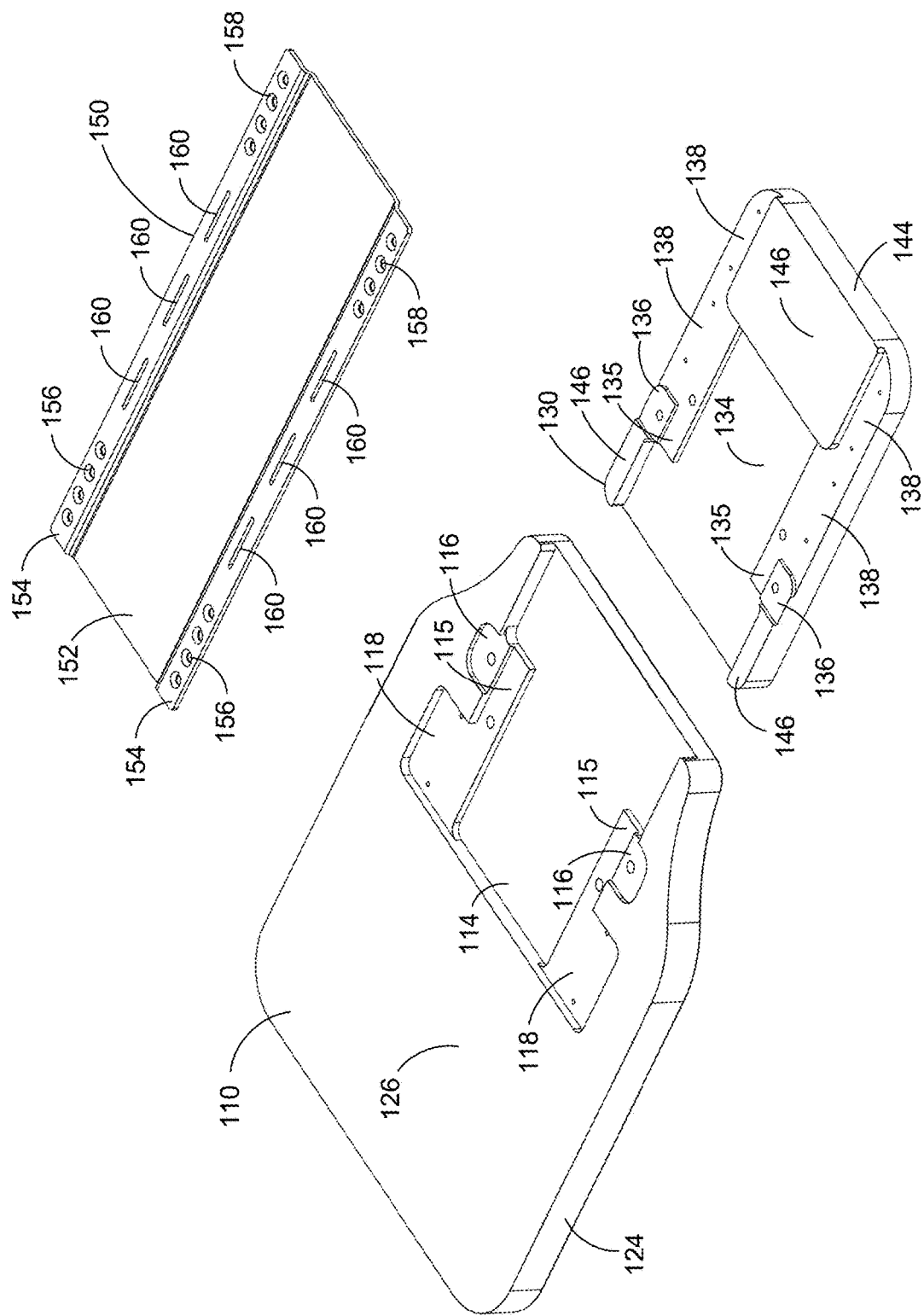
Figure 1D:
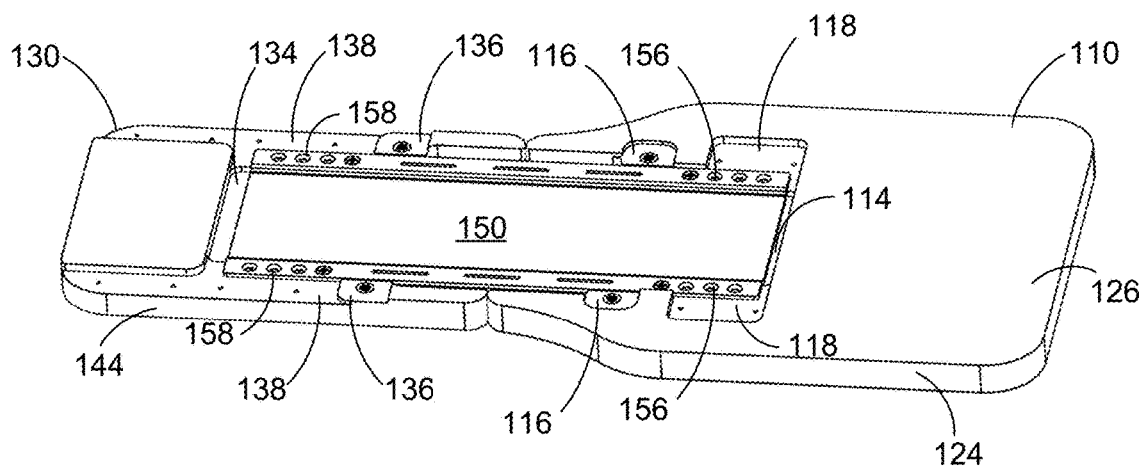
Figure 1E:
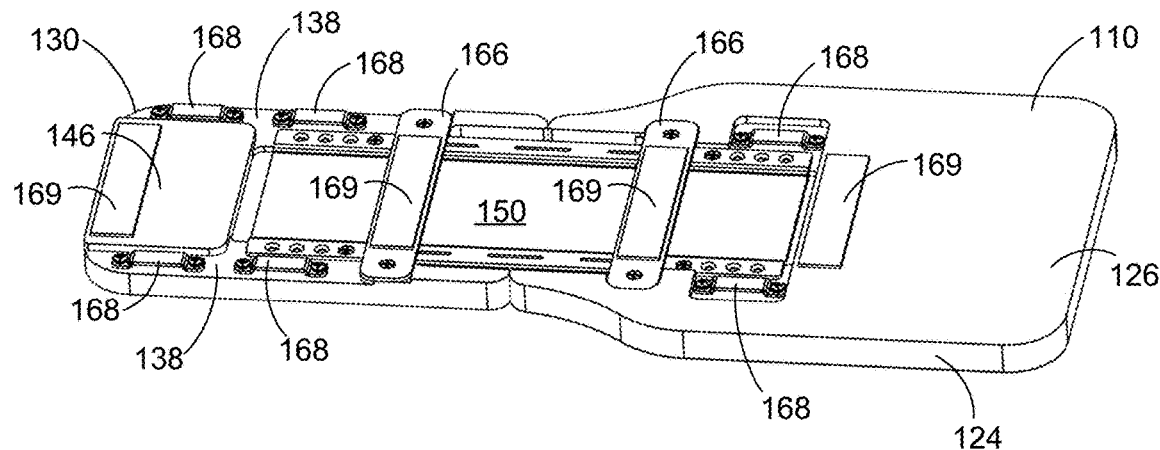
Figure 1F:
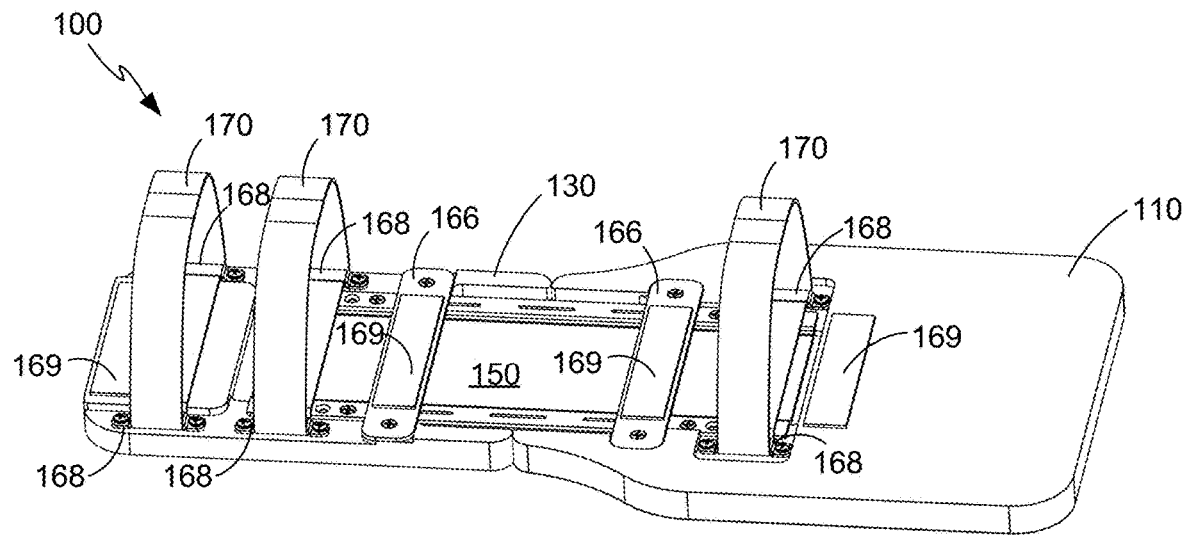

FIGS. 1A-1F illustrate components of an adjustable armrest mouse pad 100, which includes a mouse pad platform 110, a separate armrest platform 130, and an adjustment plate 150 bridging the armrest platform 130 and the mouse pad platform 110. Specifically, FIG. 1A illustrates a top perspective view of adjustable armrest mouse pad 100, and FIG. 1B illustrates a bottom perspective view of adjustable armrest mouse pad 100. FIG. 1C illustrates a bottom perspective exploded view of armrest platform 130, separate mouse pad platform 110 and adjustment plate 150. FIG. 1D illustrates a subassembly including armrest platform 130, separate mouse pad platform 110 and adjustment plate 150. FIG. 1E illustrates the subassembly of FIG. 1D with the addition of support plates 166, strap brackets 168 and pads 169. FIG. 1F illustrates the subassembly of FIG. 1E with the addition of hook and loop straps 170.

Adjustable armrest mouse pad 100 is configured to mount to the arm of a desk chair. Mouse pad platform 110 forms an upper mouse pad platform surface 122 suitable for operating a computer mouse. Mouse pad platform 110 includes a recessed mouse pad 112 in upper mouse pad platform surface 122. The edge around the perimeter of recessed mouse pad 112 helps prevent a computer mouse from sliding off upper mouse pad platform surface 122. In some examples, recessed mouse pad 112 may include a textured surface to resist sliding of the computer mouse when not under the control of a user.

Mouse pad platform 110 also includes optional wrist pad 128 attached to upper mouse pad platform surface 122. For example, wrist pad 128 may be a formed from a closed cell foam or foam rubber and attached to upper mouse pad platform surface 122 with an adhesive, such as a double-sided tape.

Armrest platform 130 forms an upper armrest platform surface 142 suitable for supporting a forearm of a user while operating the computer mouse. Armrest platform 130 includes a pad 132 in upper armrest platform surface 142. Pad 132 is generally coplanar or raised as compared to upper armrest platform surface 142. Pad may include a cushion to improve user comfort.

Adjustment plate 150 is fixedly coupled to an underside of mouse pad platform 110 along bottom surface 126 and an underside of the armrest platform 130 along bottom surface 146, thereby connecting mouse pad platform 110 and armrest platform 130. Adjustment plate 150 is selectively positionable along the underside of mouse pad platform 110 and selectively positionable along the underside of armrest platform 130 allowing adjustable spacing between mouse pad platform 110 and armrest platform 130. Thus, adjustable armrest mouse pad 100 may be adjusted to provide a user's preferred spacing between mouse pad platform 110 and armrest platform 130.

In some examples, mouse pad platform 110 and/or armrest platform 130 may be primarily formed from a wood product. For example, the wood product may include natural wood, plywood, and/or a fiberboard comprising wood particles and a binding agent. Such fiberboards may include medium density fiberboard (MDF). Some of such examples may include a laminate over at least a portion of the wood product, such as a laminate forming the upper mouse pad platform surface 122 and/or the upper armrest platform surface 142.

As compared to other design incorporating primarily plastic materials, the wood product may provide increase rigidity as well as facilitate unique shapes. For example, while plastic components must have tapered side surfaces to allow removal from a mold, the planar upper surface 122, the side surfaces 124 and the bottom surface 126 of the mouse pad platform 110 may form right angles relative to each other. Likewise, the planar upper surface 142, the side surfaces 144 and the bottom surface 146 of the armrest platform 130 may form right angles relative to each other. In another variation, all or portions of side surfaces 124, 144 may include a rounded, convex, surface formed by edge banding between the upper surfaces and the undersides. The edge banding covers and seals the side surfaces of the base material, providing protection and improving the appearance of the product.

As best shown in FIG. 1C, adjustment plate 150 defines an extruded profile including a planar central portion 152 and wing portions 154 on either side of planar central portion 152. Wing portions 154 include four pairs of mounting holes 156 for selectively positioning and attaching adjustment plate 150 to the underside of mouse pad platform 110. Likewise, wing portions 154 include another four pairs of mounting holes 158 for selectively positioning and attaching adjustment plate 150 to the underside of armrest platform 130. In some examples, adjustment plate 150 may be generally symmetrically such that mounting holes 158 may also be used for selectively positioning and attaching adjustment plate 150 to the underside of armrest platform 130 while mounting holes 156 are used for selectively positioning and attaching adjustment plate 150 to the underside of mouse pad platform 110.

Both mouse pad platform 110 and armrest platform 130 include features configured to mate with the extruded profile of adjustment plate 150. Specifically, the underside of mouse pad platform 110 forms a first adjustment plate recess 114 with shelves 115 mirroring the extruded profile of adjustment plate 150 facilitating the selective positioning of adjustment plate 150. Likewise, the underside of armrest platform forms a second adjustment plate recess 134 with shelves 135 mirroring the extruded profile of adjustment plate 150 facilitating the selective positioning of adjustment plate 150 along the underside of armrest platform 130.

Adjustment plate 150 is selectively mountable to mouse pad platform 110 by aligning one of the pairs of mounting holes 156 with screw holes in shelves 115 of recess 114. Likewise, adjustment plate 150 is selectively mountable to armrest platform 130 by aligning one of the pairs of mounting holes 158 with screw holes in shelves 135 of recess 134. In some examples, the screw holes of mouse pad platform 110 and armrest platform 130 may include screw inserts to improve attachment strength and resist stripping.

Adjustable armrest mouse pad 100 includes additional features to further improve the attachment strength of mouse pad platform 110, armrest platform 130, and adjustment plate 150 relative to each other. Specifically, a first support plate 166 is mounted within support plate recess 116 and over adjustment plate 150 on the underside of mouse pad platform 110. The first support plate 166 compresses adjustment plate 150 within the first adjustment plate recess 114 further securing adjustment plate 150 to mouse pad platform 110. The additional support provided by the first support plate 166 may be important to resist pullout of screws securing adjustment plate 150 within the first adjustment plate recess 114. Likewise, as second support plate 166 is mounted within support plate recess 136 and over adjustment plate 150 on the underside of armrest platform 130. The second support plate 166 compresses adjustment plate 150 within the second adjustment plate recess 134 further securing adjustment plate 150 to armrest platform 130. The additional support provided by the second support plate 166 may be important to resist pullout of screws securing adjustment plate 150 within the second adjustment plate recess 134.

Adjustable armrest mouse pad 100 includes pads 169 on bottom surface 126 of mouse pad platform 110 and bottom surface 146 of armrest platform 130, as well as both support plates 166. Bottom surface 126 of mouse pad platform 110, bottom surface 146 of armrest platform 130, and both support plates 166 may be in generally planar alignment such that pads 169 represent raised surfaces relative to these features. Pads 169 may improve friction between adjustable armrest mouse pad 100 and a chair arm and may also provide a non-scuffing surface. For example, pads 169 may be formed from an elastic material, such as a plastic or a rubber material.

Adjustable armrest mouse pad 100 further includes straps 170, which are operable to secure adjustable armrest mouse pad 100 to the arm of a desk chair. In some examples, one or more of straps 170 include hook and loop fasteners such that straps 170 are secured to a chair arm by tightening the strap around the chair arm and pressing the strap 170 on itself to close the hook and loop fasteners.

Mouse pad platform 110, armrest platform 130, and adjustment plate 150 each include strap mounts suitable to couple straps 170 to adjustable armrest mouse pad 100. Specifically, mouse pad platform 110 includes a single pair of strap brackets 168, secured by screws to the underside of mouse pad platform 110 within bracket recesses 118, whereas armrest platform 130 includes a two pairs of strap brackets 168, secured by screws to the underside of armrest platform 130 within bracket recesses 138. Adjustment plate 150 includes three pairs of slots 160 in wing portions 154 allowing for multiple strap positions in adjustment plate 150.

Adjustable armrest mouse pad 100 includes more strap mounts than straps 170, such that the user may select the position of straps 170 to best fit a particular chair arm for a given extension of mouse pad platform 110 relative to armrest platform 130.

Figure 4A:
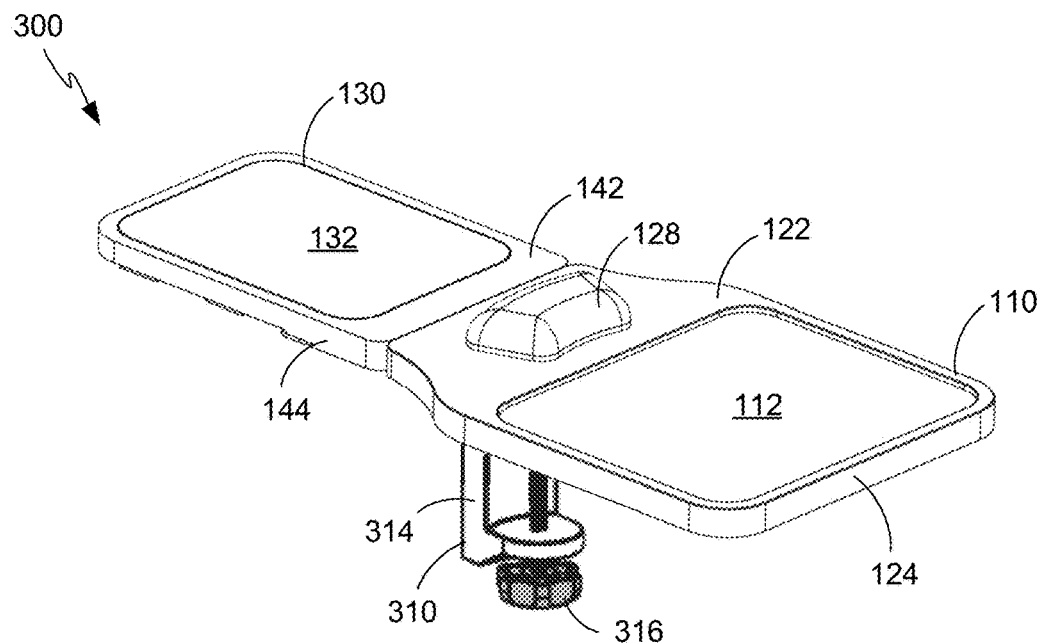
FIGS. 4A-4B illustrate an adjustable armrest mouse pad including an armrest, a separate mouse pad and an adjustment plate bridging the armrest and the mouse pad with a clamp for attachment to a desk.
Figure 4B:
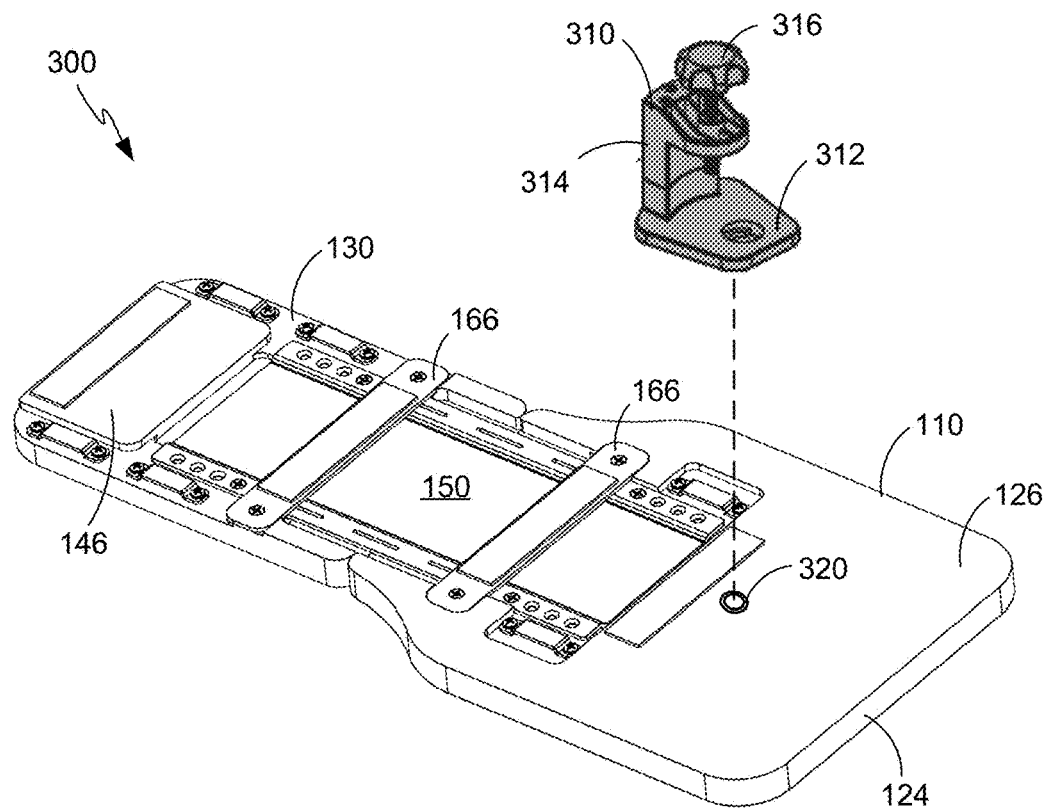

In an alternative to the strap mounts and straps 170 configured to attached to an arm of a desk chair, the underside of mouse pad platform 110 may include a clamp configured to attach to a computer desk as described with respect to FIGS. 4A-4B.

Adjustable armrest mouse pad 100 may provide one or more advantages compared to other armrest mouse pads. For example, the three-piece design (mouse pad platform 110, armrest platform 130, and adjustment plate 150) provides adjustability to allow a user to select a preferred position for the mouse pad compared to the armrest. Moreover, designs incorporating wood products may provide increase rigidity compared to plastic designs. The inventors have discovered that such plastic products, while suitable for using a mouse, are frequently broken when a user pushes on the mouse pad while standing up from a desk chair. Moreover, adjustable armrest mouse pad 100 includes specific features improving attachment strength between mouse pad platform 110, armrest platform 130, and adjustment plate 150. As discussed previously, such features include the mating profiles between adjustment plate 150 and the undersides of mouse pad platform 110 and armrest platform 130, and the inclusion of support plates 166 to further secure adjustment plate 150 to the undersides of mouse pad platform 110 and armrest platform 130.

Generally, adjustable armrest mouse pad 100 is sold as a partially assembled kit including the individual components of adjustable armrest mouse pad. In particular, mouse pad platform 110, armrest platform 130, and adjustment plate 150 may be disassembled to facilitate compact packaging reducing both packaging and shipping costs as the longest dimension of the packaging material is shorter than a fully assembled adjustable armrest mouse pad 100. Such a kit also allows a user to select the relative positions of armrest platform 130 and mouse pad platform 110 without needing to first disassemble adjustable armrest mouse pad 100.

FIGS. 2A-2G illustrate process steps for assembling adjustable armrest mouse pad 100. FIG. 3 is flowchart of a method of assembling an adjustable armrest mouse pad, such as adjustable armrest mouse pad 100. For clarity, the techniques of FIG. 3 are described with respect to FIGS. 2A-2G and adjustable armrest mouse pad 100.

Figure 2A:
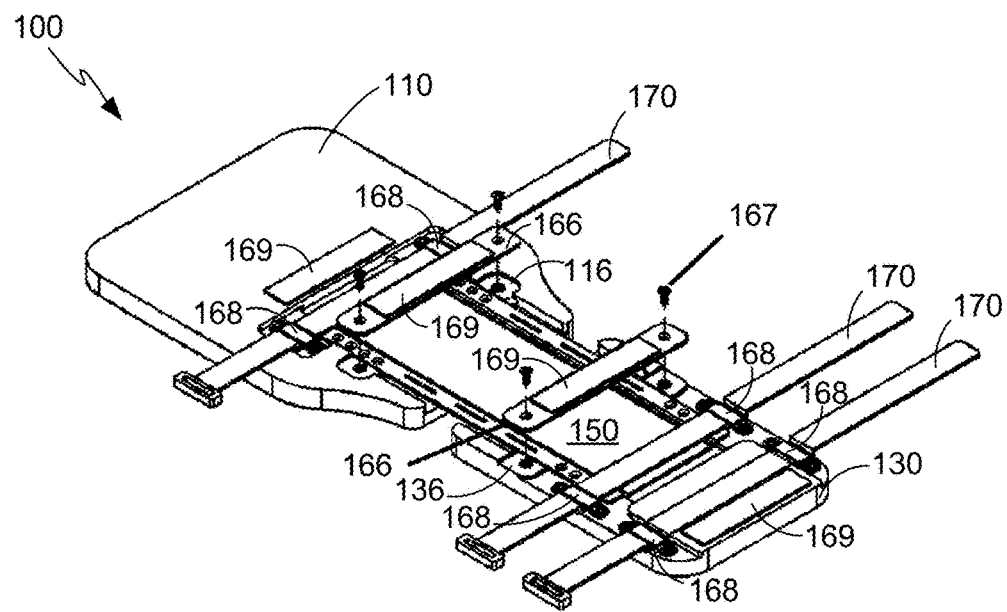
FIGS. 2A-2G illustrate process steps for assembling the adjustable armrest mouse pad of FIGS. 1A-1F.
Figure 3:
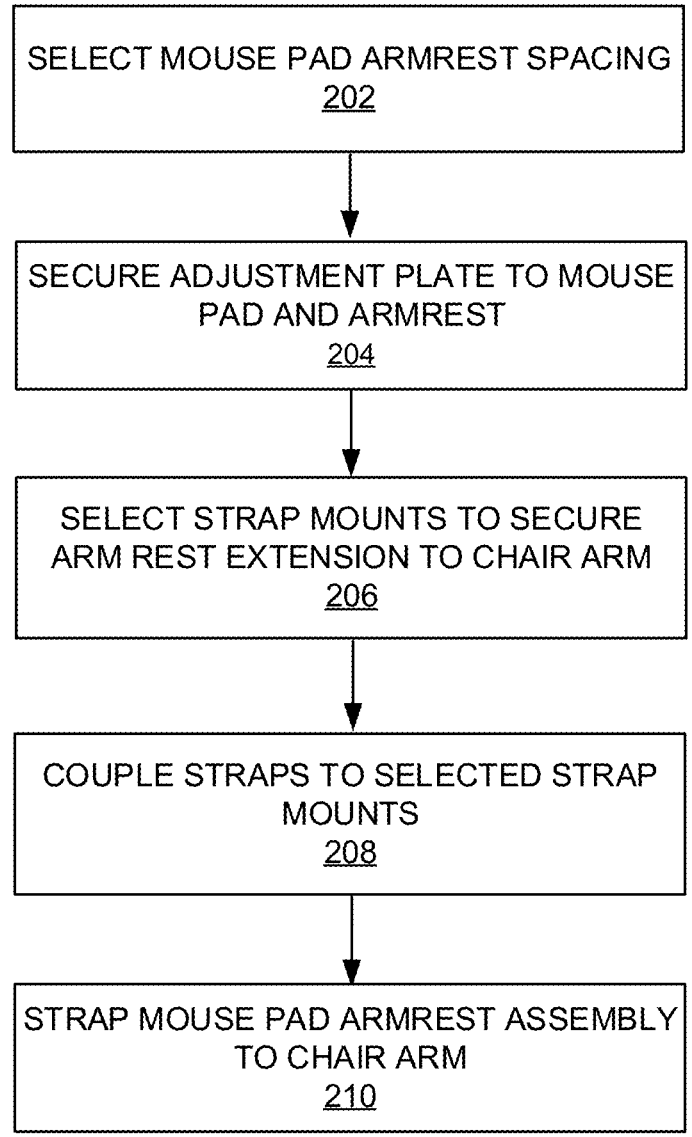
FIG. 3 is flowchart of a method of assembling an adjustable armrest mouse pad, such as the adjustable armrest mouse pad of FIGS. 1A-1F.

As shown in FIG. 2A, a user aligns adjustment plate 150 within adjustment plate recess 114 on the underside of mouse pad platform 110 and within adjustment plate recess 134 on the underside of armrest platform 130. The user loosely installs support plates 166 without fully tightening screws 167 such that mouse pad platform 110, armrest platform 130, and adjustment plate 150 are slidable relative to each other.

Figure 2B:
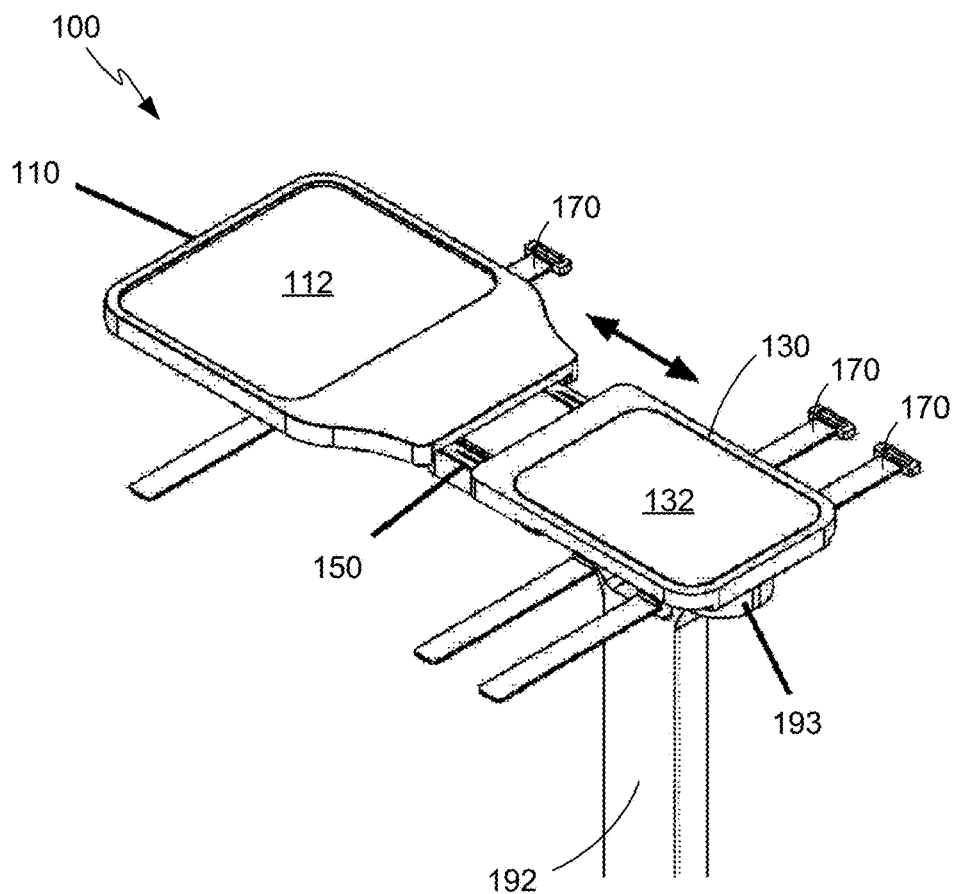

As shown in FIG. 2B, the user places the loose assembly on armrest 193 of chair arm 192. The user selecting a preferred spacing between mouse pad platform 110 and armrest platform 130 by sliding mouse pad platform 110 and armrest platform 130 relative to adjustment plate 150 (FIG. 3, step 202).

Figure 2C:
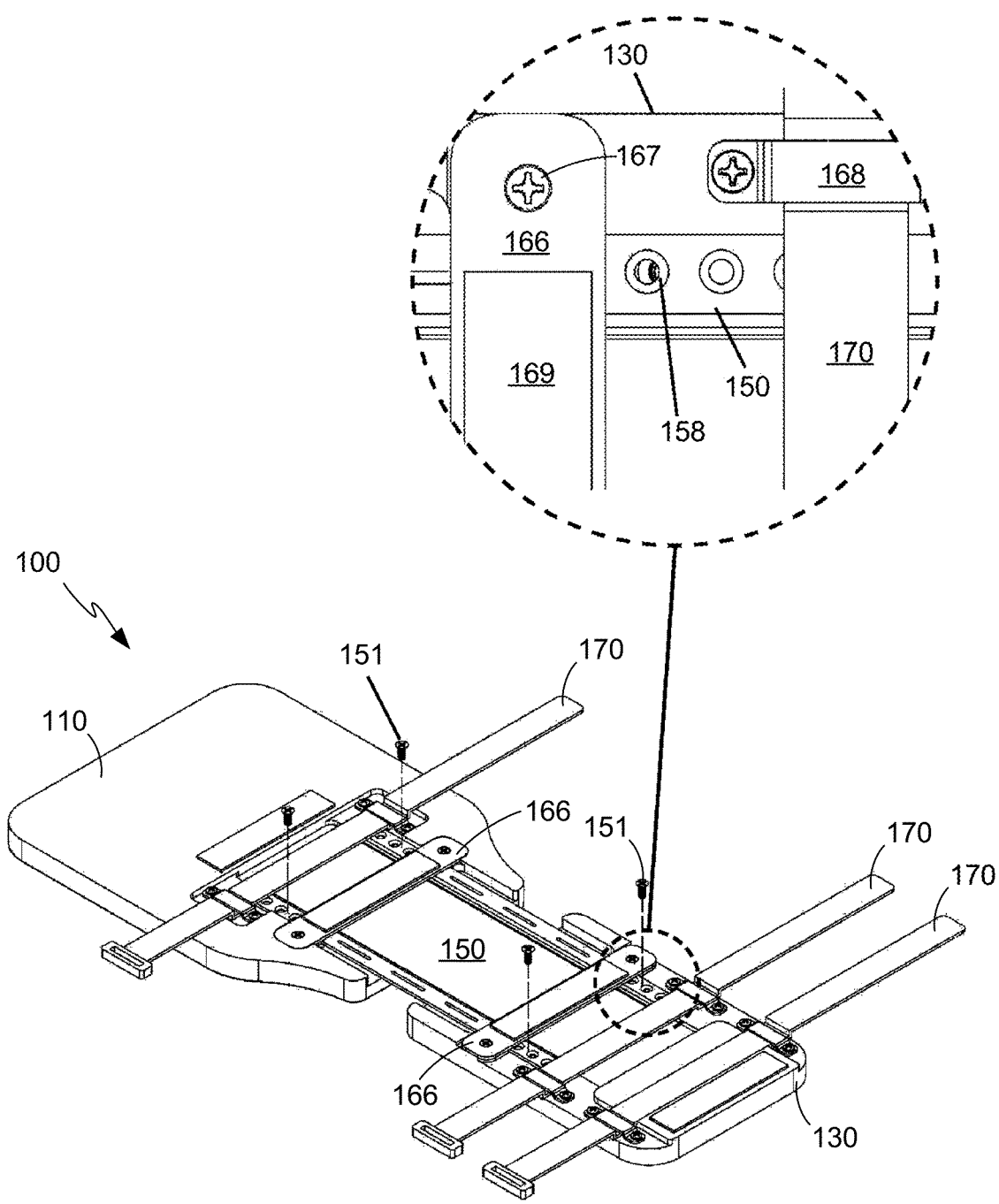

As shown in FIG. 2C, the user flips the loose assembly over while maintaining the preferred spacing. The user secures adjustment plate 150 to mouse pad platform 110 and armrest platform 130 with the preferred spacing between mouse pad platform 110 and armrest platform 130 (FIG. 3, step 204). Specifically, the user locates the closest mounting holes 156, 158 to the predrilled holes in mouse pad platform 110 and armrest platform 130 and installs screws 151 through the closest mounting holes 156, 158 and into the predrilled holes in mouse pad platform 110 and armrest platform 130. The user then tightens screws 167 to securely install support plates 166, thereby pinching adjustment plate 150 within adjustment plate recess 114 on the underside of mouse pad platform 110 and within adjustment plate recess 134 on the underside of armrest platform 130.

Figure 2D:
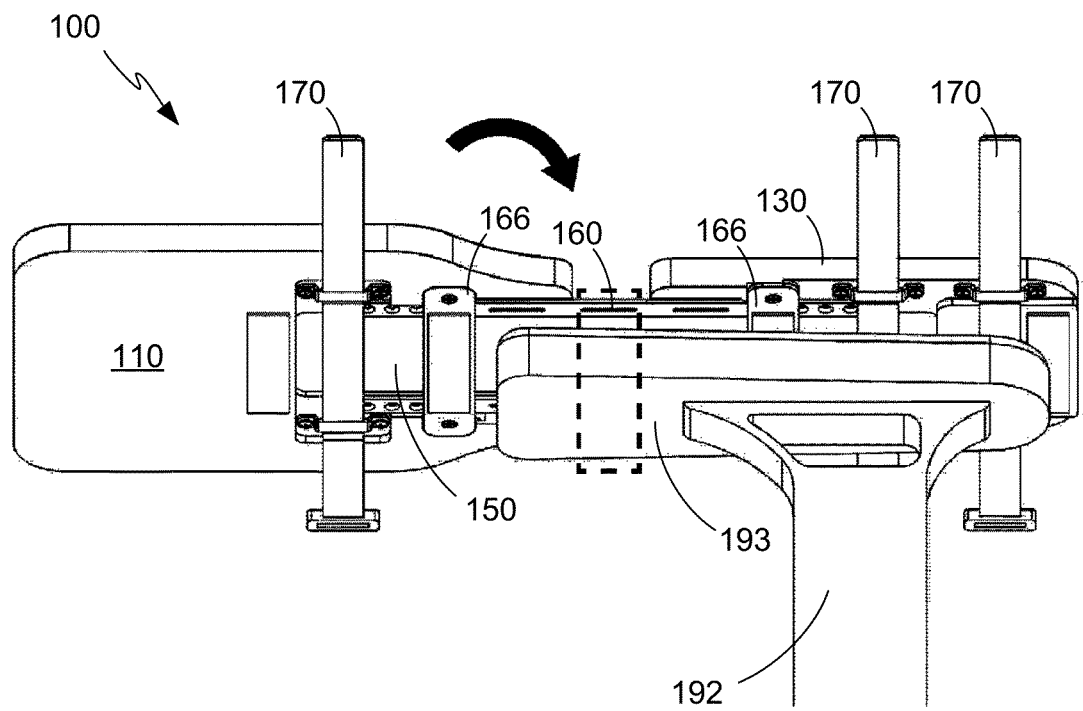

As shown in FIG. 2D, the user selects strap mounts on mouse pad platform 110, armrest platform 130, and adjustment plate 150 (FIG. 3, step 206). Preferably, the selected strap mounts include strap mounts on either side of chair arm 192, and also include mounts on at least two of mouse pad platform 110, armrest platform 130, and adjustment plate 150, if not all three. As previously discussed, mouse pad platform 110 includes a single pair of strap brackets 168, armrest platform 130 includes two pairs of strap brackets 168, and adjustment plate 150 includes three pairs of slots 160 in wing portions 154. Depending on the relative positions of mouse pad platform 110, armrest platform 130, and adjustment plate 150 some or all of slots 160 may be inaccessible. In the example of FIG. 2D, a single pair of slots 160 is readily accessible.

Figure 2E:
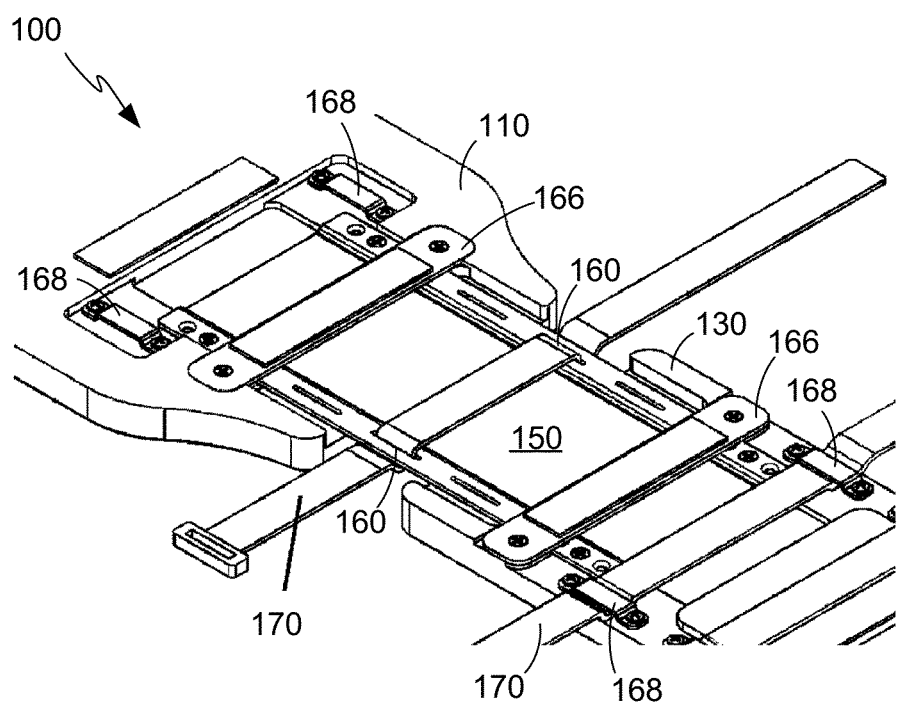

As shown in FIG. 2E, the user couples straps 170 to the selected strap mounts by threading the straps 170 through the strap mounts (FIG. 3, step 208).

Figure 2F:
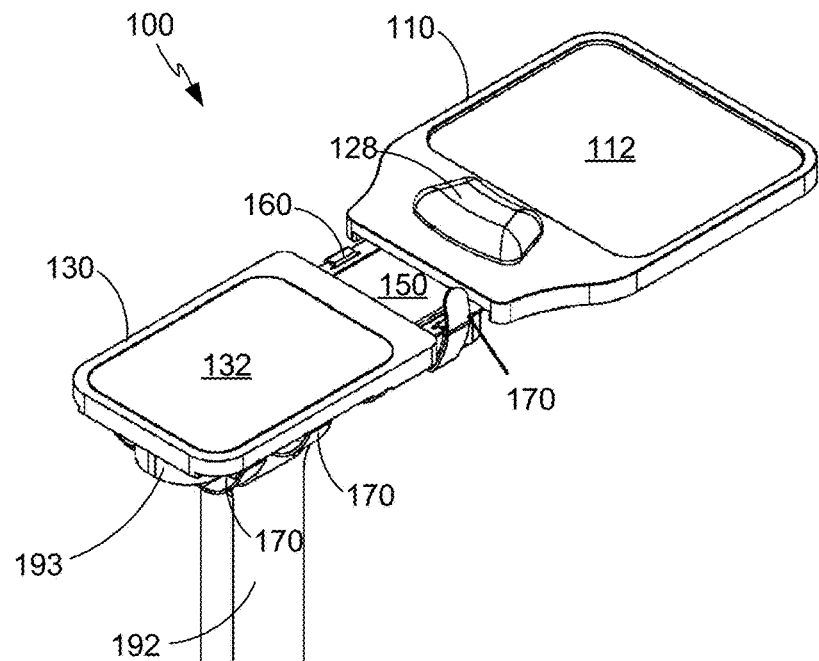

As shown in FIG. 2F, the user straps the adjustable armrest mouse pad 100 to armrest 193 of arm 192 of desk chair 190 with straps 170 (FIG. 3, step 210). In some examples, one or more of straps 170 include hook and loop fasteners such that straps 170 are secured to chair arm 192 by tightening the strap 170 around armrest 193 and pressing the strap 170 on itself to close the hook and loop fasteners.

Figure 2G:
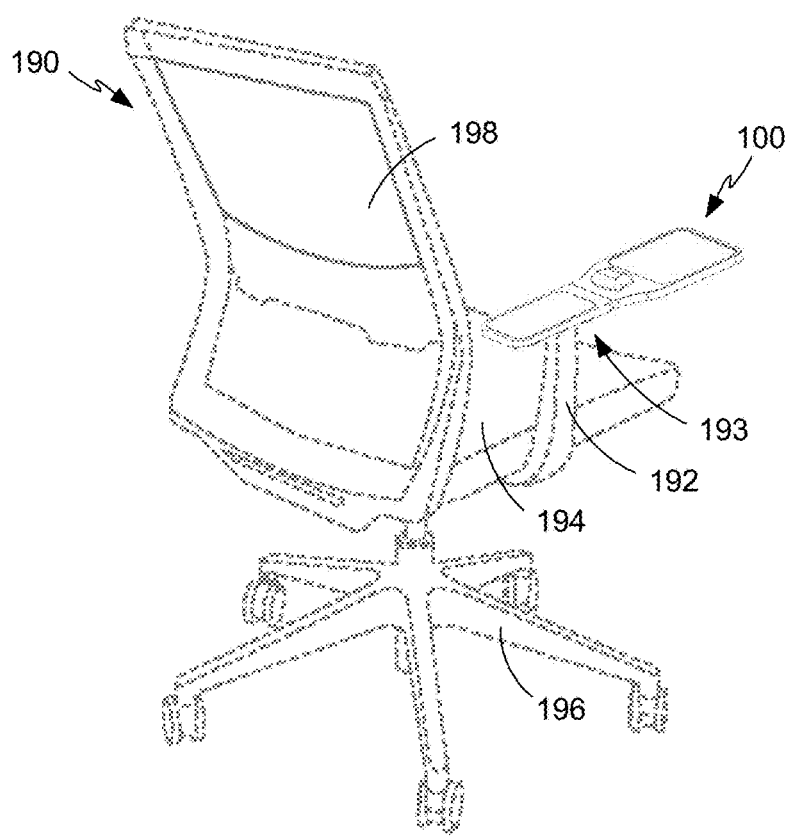

FIG. 2G illustrates the fully assembled adjustable armrest mouse pad 100 installed on armrest 193 of arm 192 of desk chair 190. Desk chair 190 further includes a seat 194, backrest 198, and base 196. Base 196 include legs with swiveling rollers. The adjustability of adjustable armrest mouse pad 100 provide an ergonomic location for operation of a computer mouse with desk chair 190 and is adaptable to any number of additional armrest and chair designs.

FIGS. 4A-4B illustrate an adjustable armrest mouse pad 300 with a clamp 310 for attachment to a desk rather than straps 170. Specifically, FIG. 4A illustrates a top perspective view of adjustable armrest mouse pad 300, and FIG. 4B illustrates a bottom perspective view of adjustable armrest mouse pad 300. Adjustable armrest mouse pad 300 also includes mouse pad platform 110, armrest platform 130, adjustment plate 150, and support plates 166.

Adjustable armrest mouse pad 300 substantially similar to adjustable armrest mouse pad 100 with the addition of clamp 310 and the absence of straps 170. In some examples a kit may include both clamp 310 and straps 170 such that a user may attach the adjustable armrest mouse pad to either an arm of a chair with straps 170 or to a desk with clamp 310. For brevity, details regarding adjustable armrest mouse pad 300 that are the same or similar to those described with respect to adjustable armrest mouse pad 100 are not repeated.

Clamp 310 includes a base 312 with a screw hole for attachment to the underside of mouse pad platform 110. The underside of mouse pad platform 110 is modified to include a threaded screw hole 320 to receive the attachment screw for clamp 310. Clamps 310 further includes arm 314 with a threaded hole and clamp screw 316. After attaching clamp 310 to the underside of mouse pad platform 110, a user turns clamp screw 316 to operate clamp 310. The user may attach adjustable armrest mouse pad 300 to the desk by pinching the desktop between base 312 and the end of clamp screw 316. In some examples, underside of mouse pad platform 110 may be modified to include a recess such that base 312 is generally flush with bottom surface 126—providing increased contact area between the desktop and adjustable armrest mouse pad 300.

Figure 5A:
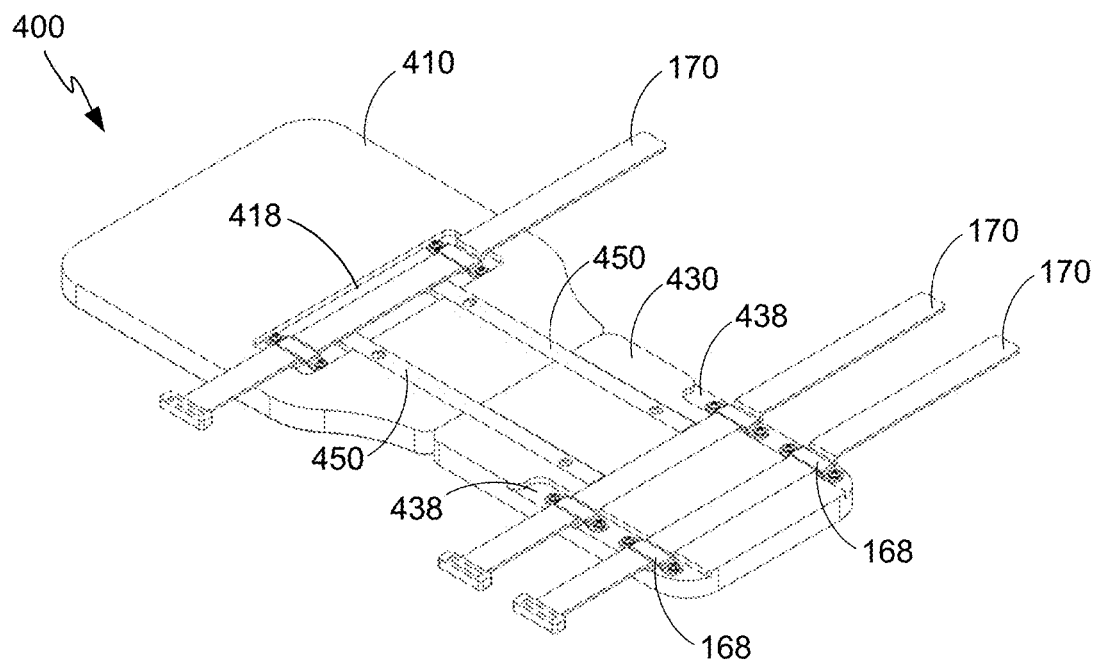
FIGS. 5A-5D illustrate an adjustable armrest mouse pad including an armrest, a separate mouse pad and two adjustment bars bridging the armrest and the mouse pad with straps for attachment to an arm of a desk chair.
Figure 5B:
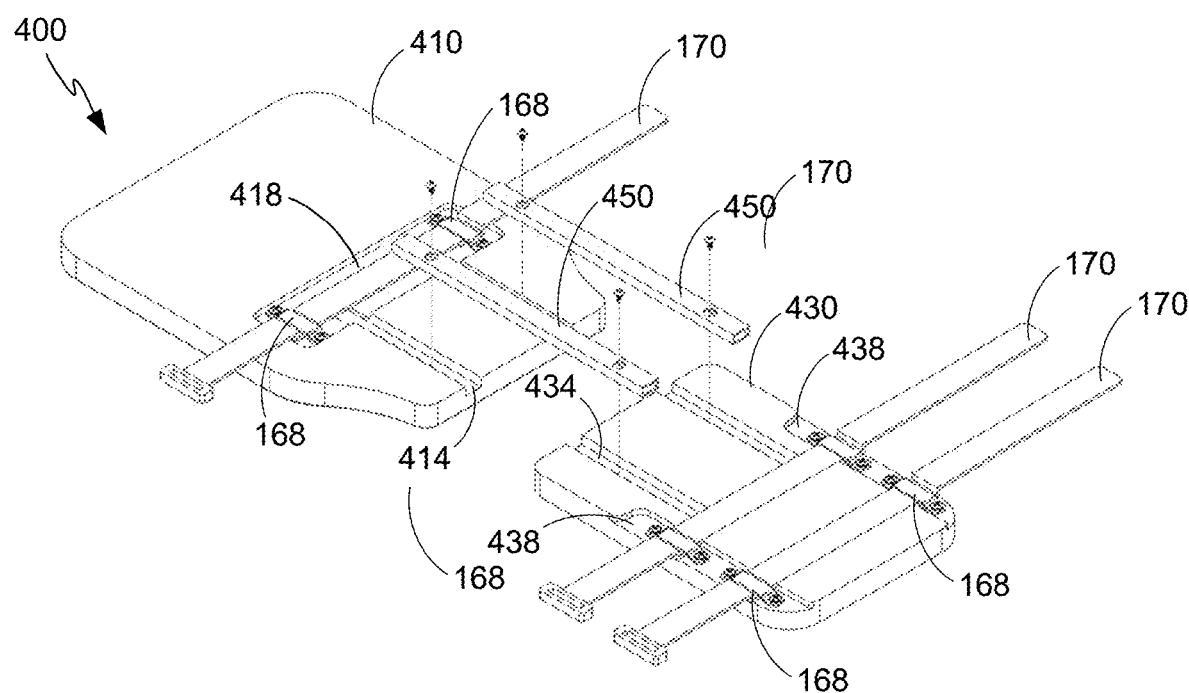
Figure 5C:
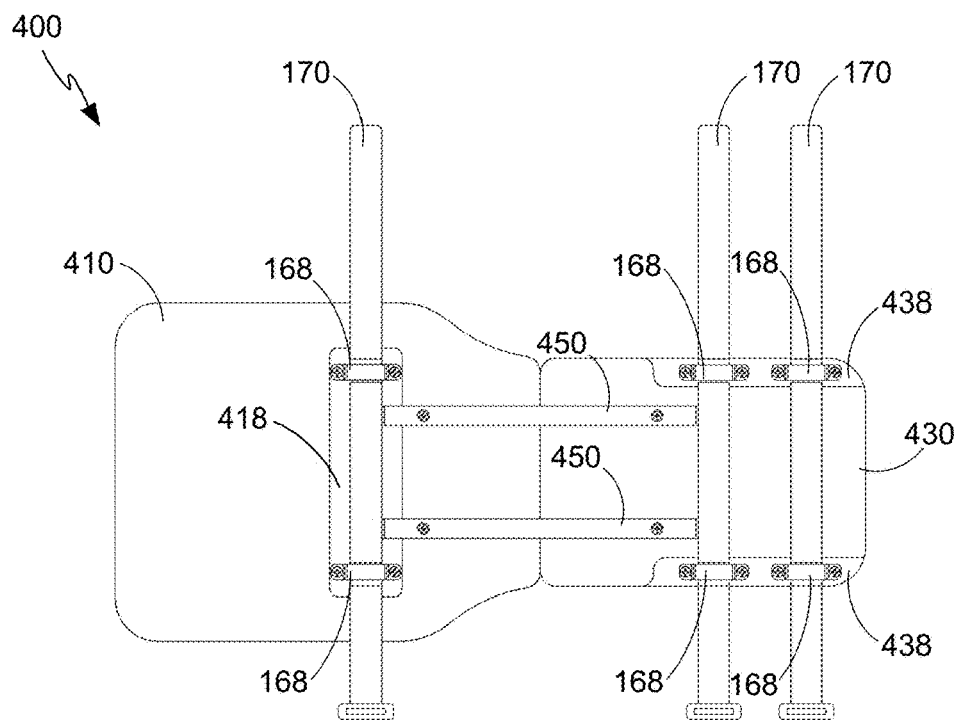
Figure 5D:
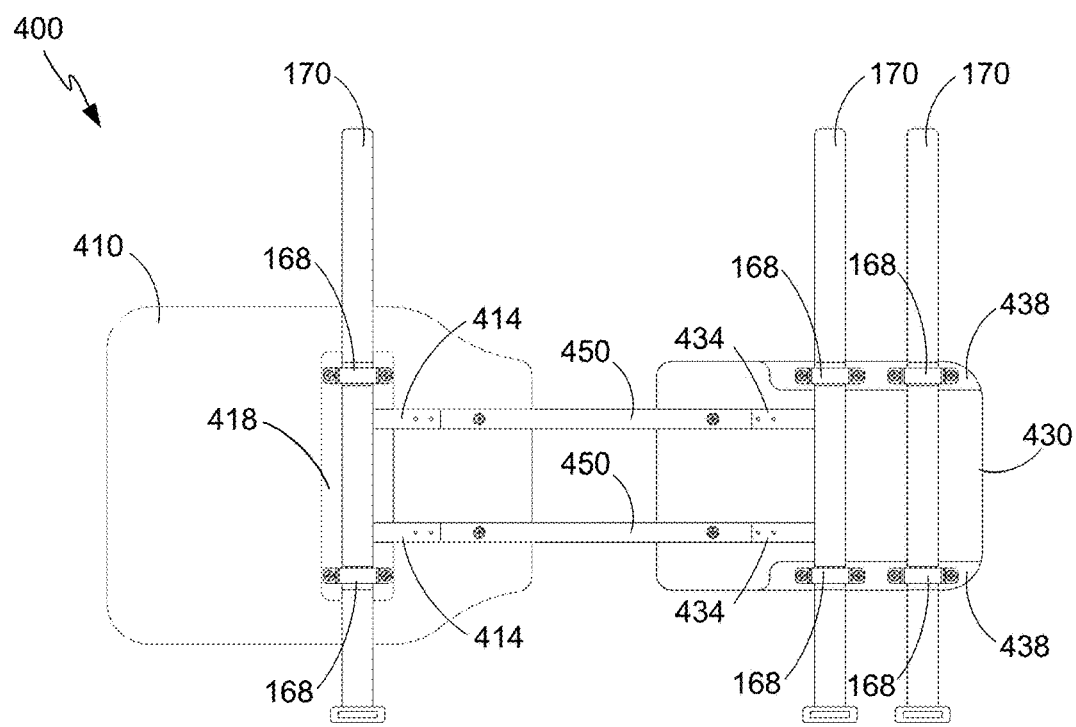

FIGS. 5A-5D illustrate an adjustable armrest mouse pad 400 including a mouse pad platform 410, armrest platform 430, adjustment bars 450, and straps 170 for attachment to an arm of a desk chair. Specifically, FIG. 5A illustrates a bottom perspective view of adjustable armrest mouse pad 400, FIG. 5B illustrates an exploded bottom perspective view of adjustable armrest mouse pad 400. FIG. 5C illustrates a bottom view of adjustable armrest mouse pad 400 in a fully retracted position, while FIG. 5D illustrates a bottom view of adjustable armrest mouse pad 400 with mouse pad platform 410 separated from armrest platform 430.

Adjustable armrest mouse pad 400 substantially similar to adjustable armrest mouse pad 100 with the replacement of adjustment plate 150 with two adjustment bars 450. For brevity, details regarding adjustable armrest mouse pad 400 that are the same or similar to those described with respect to adjustable armrest mouse pad 100 are not repeated.

Adjustment bars 450 are fixedly coupled to an underside of mouse pad platform 410 and an underside of the armrest platform 430, thereby connecting mouse pad platform 410 and armrest platform 430. Adjustment bars 450 are selectively positionable along the underside of mouse pad platform 410 and selectively positionable along the underside of armrest platform 430 allowing adjustable spacing between mouse pad platform 410 and armrest platform 430. Thus, adjustable armrest mouse pad 400 may be adjusted to provide a user's preferred spacing between mouse pad platform 410 and armrest platform 430.

As best shown in FIG. 5B, adjustment bars 450 each define a rectangular extruded profile including mounting holes on either end. Both mouse pad platform 410 and armrest platform 430 include features configured to mate with the profiles of adjustment bars 450. Specifically, the underside of mouse pad platform 410 forms a first adjustment bar recess 414 mirroring the extruded profile of adjustment bars 450 facilitating the selective positioning of adjustment bars 450. Likewise, the underside of armrest platform forms a second adjustment bar recess 434 mirroring the extruded profile of adjustment bars 450 facilitating the selective positioning of adjustment bars 450 along the underside of armrest platform 430.

Adjustment bars 450 are selectively mountable to mouse pad platform 410 by aligning the mounting holes with one of a plurality of screw holes in recess 414. Likewise, bars 450 are selectively mountable to armrest platform 430 by aligning the mounting holes with one of a plurality of screw holes in recess 434. In some examples, the screw holes of mouse pad platform 410 and armrest platform 430 may include screw inserts to improve attachment strength and resist stripping.

Adjustable armrest mouse pad 400 further includes straps 170, which are operable to secure adjustable armrest mouse pad 400 to the arm of a desk chair. In other variations, clamp 310 may be added to the underside of mouse pad platform 410 as described with respect to adjustable armrest mouse pad 300.

Mouse pad platform 410 and armrest platform 430 each include strap mounts suitable to couple straps 170 to adjustable armrest mouse pad 400. Specifically, mouse pad platform 410 includes a single pair of strap brackets 168, secured by screws to the underside of mouse pad platform 410 within bracket recess 418, whereas armrest platform 430 includes a two pairs of strap brackets 168, secured by screws to the underside of armrest platform 430 within bracket recesses 438.

Adjustable armrest mouse pad 400 may include additional features previously described with respect to adjustable armrest mouse pad 100, such as pads 169 on its bottom surfaces and/or support plates 166 to resist pullout of screws securing adjustment bars 450 within the first adjustment bar recess 414 and the second adjustment bar recess 434.

The upper surfaces of adjustable armrest mouse pad 400 may be substantially similar to adjustable armrest mouse pad 100 and may include, for example, a recessed mouse pad 112 and wrist pad 128 attached to mouse pad platform 410. In addition, armrest platform 430 forms an upper armrest platform surface suitable for supporting a forearm of a user while operating the computer mouse. Armrest platform 430 may include a pad 132.

In some examples, mouse pad platform 410 and/or armrest platform 430 may be primarily formed from a wood product as described with respect to adjustable armrest mouse pad 100.

Figure 6A:
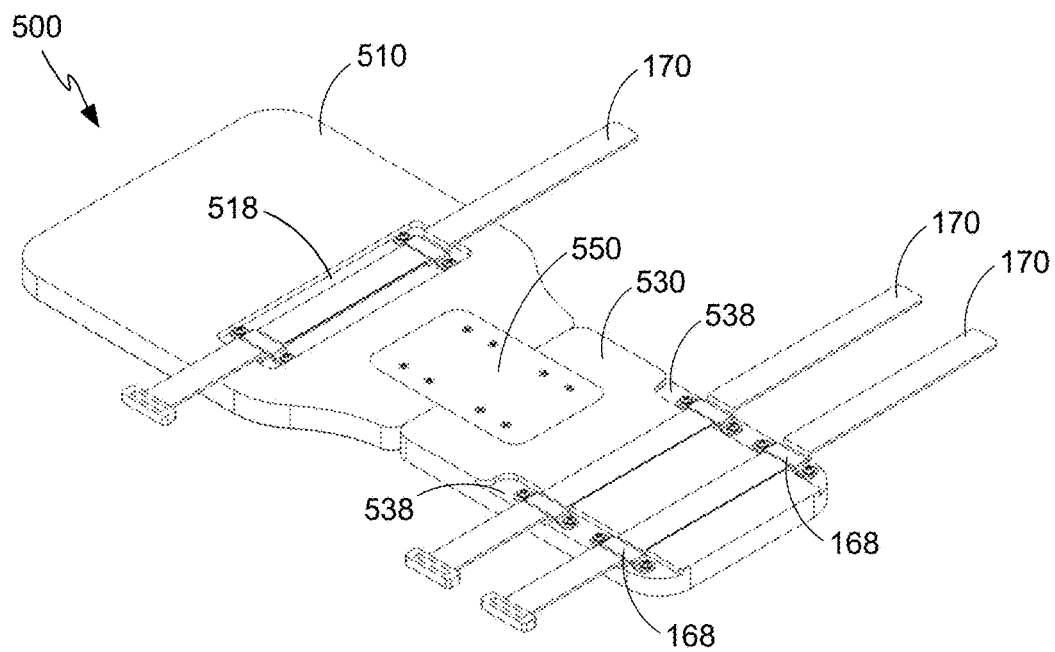
FIGS. 6A-6C illustrate a armrest mouse pad including an armrest, a separate mouse pad and a fixed plate bridging the armrest and the mouse pad with straps for attachment to an arm of a desk chair.
Figure 6B:
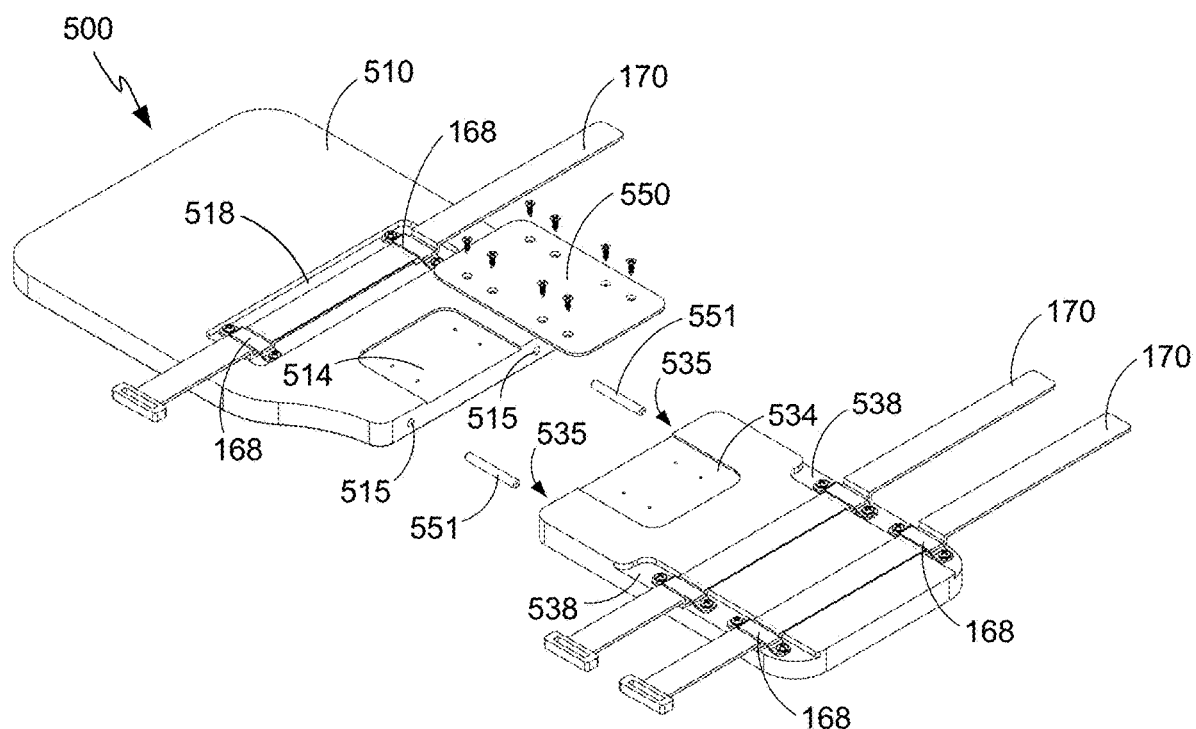
Figure 6C:
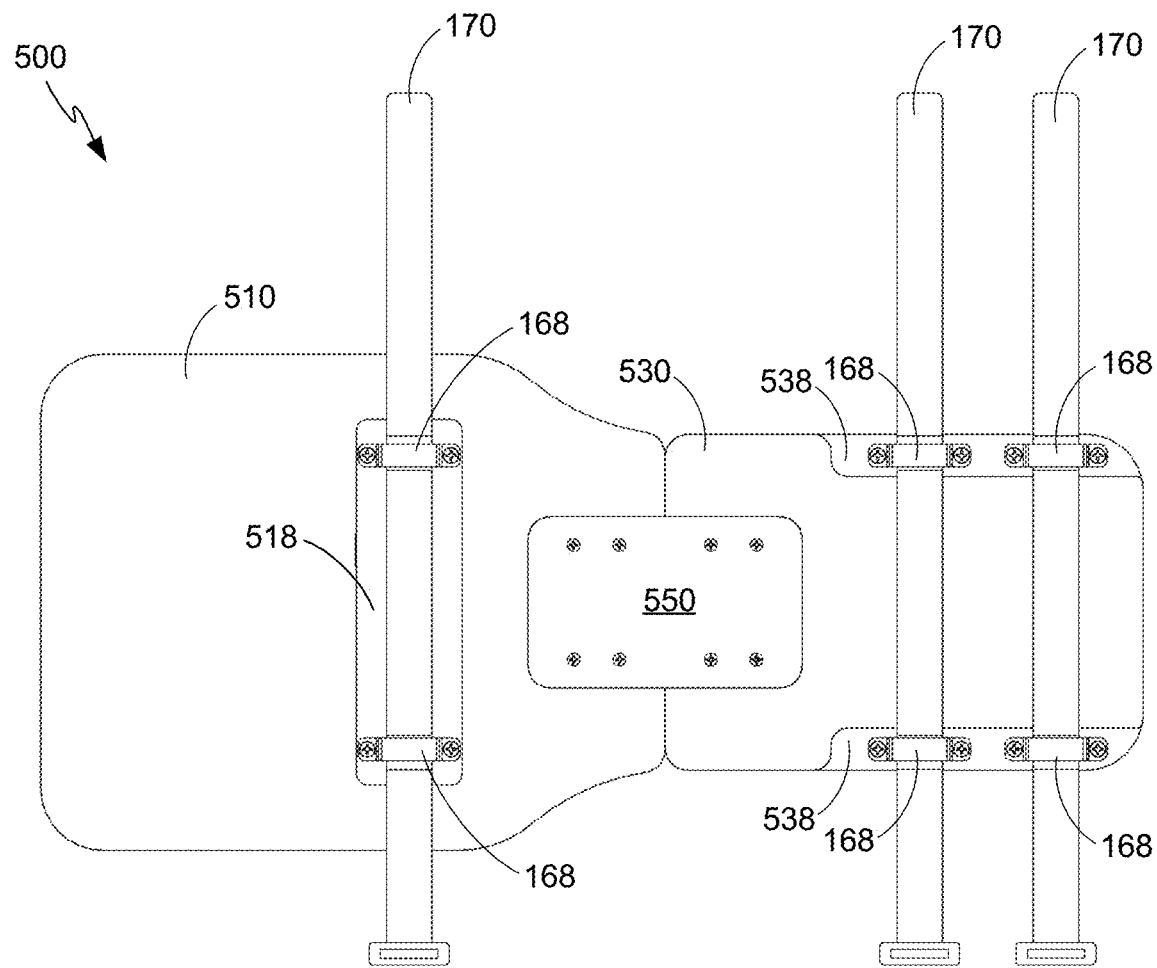

FIGS. 6A-6C illustrate an adjustable armrest mouse pad 500 including a mouse pad platform 510, armrest platform 530, fixed plate 550, and straps 170 for attachment to an arm of a desk chair. Specifically, FIG. 5A illustrates a bottom perspective view of Armrest mouse pad 500, FIG. 5B illustrates an exploded bottom perspective view of Armrest mouse pad 500, and FIG. 5C illustrates a bottom view of Armrest mouse pad 500.

Adjustable armrest mouse pad 500 substantially similar to adjustable armrest mouse pad 100 with the replacement of 150 with fixed plate 550 and dowels 551. For brevity, details regarding adjustable armrest mouse pad 500 that are the same or similar to those described with respect to adjustable armrest mouse pad 100 are not repeated.

Fixed plate 550 is fixedly coupled to an underside of mouse pad platform 510 and an underside of the armrest platform 530, thereby connecting mouse pad platform 510 and armrest platform 530. As best shown in FIG. 5B, fixed plate 550 planar profile including an array of mounting holes. Both mouse pad platform 510 and armrest platform 530 include features configured to mate with the planar profile of fixed plate 550. Specifically, the underside of mouse pad platform 510 forms a first recess 514 mirroring the profile of fixed plate 550, and the underside of armrest platform forms a second recess 534 mirroring the profile of fixed plate 550. The undersides of mouse pad platform 510 and armrest platform 530 include screw holes corresponding to the array of mounting holes in fixed plate 550. In some examples, the screw holes of mouse pad platform 510 and armrest platform 530 may include screw inserts to improve attachment strength and resist stripping.

As shown in FIG. 6B, armrest mouse pad 500 includes two optional dowels 551 which insert into holes 515 on the side surface of mouse pad platform 510 and holes 535 on the side surface of armrest platform 530. Dowels 551 provide additional rigidity to the fixed connection between mouse pad platform 510 and armrest platform 530. In some examples, dowels 551 and/or plate 550 may be fixed to mouse pad platform 510 and/or armrest platform 530 with an adhesive further improving the rigidity of the fully assembled armrest mouse pad 500.

Armrest mouse pad 500 further includes straps 170, which are operable to secure Armrest mouse pad 500 to the arm of a desk chair. In other variations, clamp 310 may be added to the underside of mouse pad platform 510 as described with respect to adjustable armrest mouse pad 300.

Mouse pad platform 510 and armrest platform 530 each include strap mounts suitable to couple straps 170 to Armrest mouse pad 500. Specifically, mouse pad platform 510 includes a single pair of strap brackets 168, secured by screws to the underside of mouse pad platform 510 within bracket recess 518, whereas armrest platform 530 includes a two pairs of strap brackets 168, secured by screws to the underside of armrest platform 530 within bracket recesses 538.

Armrest mouse pad 500 may include additional features previously described with respect to adjustable armrest mouse pad 100, such as pads 169 on its bottom surfaces and/or support plates 166 to resist pullout of screws securing fixed plate 550 within the first recess 514 and the second recess 534.

The upper surfaces of Armrest mouse pad 500 may be substantially similar to adjustable armrest mouse pad 100 and may include, for example, a recessed mouse pad 112 and wrist pad 128 attached to mouse pad platform 510. In addition, armrest platform 530 forms an upper armrest platform surface suitable for supporting a forearm of a user while operating the computer mouse. Armrest platform 530 may include a pad 132.

In some examples, mouse pad platform 510 and/or armrest platform 530 may be primarily formed from a wood product as described with respect to adjustable armrest mouse pad 100.

While armrest mouse pad 500 does not provide the adjustability of adjustable armrest mouse pads 100, 300, 400, the configuration of a separate mouse pad platform 510 and armrest platform 530 still provide costs advantages over a single-piece design due to the reduced length of the components of armrest mouse pad 500. Moreover, the fixed design may provide increased rigidity compared to adjustable armrest mouse pads 100, 300, 400.

The specific techniques for armrest mouse pads including an armrest, a separate mouse pad and a support bridging the armrest and the mouse pad, including techniques described with respect to armrest mouse pads 100, 300, 400, 500 are merely illustrative of the general inventive concepts included in this disclosure as defined by the following claims.

What is claimed is:

1. An assembly comprising:
   a mouse pad platform forming an upper mouse pad platform surface suitable for operating a computer mouse;
   an armrest platform forming an upper armrest platform surface suitable for supporting a forearm of a user while operating the computer mouse;
   an adjustment plate fixedly coupled to an underside of the mouse pad platform and an underside of the armrest platform, thereby connecting the mouse pad platform and the armrest platform; and
   strap mounts on at least two of the mouse pad platform, the armrest platform, and the adjustment plate, the strap mounts being suitable to couple straps to the at least two of the mouse pad platform, the armrest platform, and the adjustment plate;
   wherein the adjustment plate is selectively positionable along the underside of the mouse pad platform and selectively positionable along the underside of the armrest platform allowing adjustable spacing between the mouse pad platform and the armrest platform.

2. The assembly of claim 1, wherein the adjustment plate defines an extruded profile including a planar central portion and wing portions on either side of the planar central portion.

3. The assembly of claim 2,
   wherein the underside of the mouse pad platform forms a first adjustment plate recess mirroring the extruded profile facilitating the selective positioning of the adjustment plate along the underside of the mouse pad platform, and
   wherein the underside of the armrest platform forms a second adjustment plate recess mirroring the extruded profile facilitating the selective positioning of the adjustment plate along the underside of the armrest platform.

4. The assembly of claim 3, further comprising:
   a first support plate over the adjustment plate compressing the adjustment plate within the first adjustment plate recess of the underside of the mouse pad platform; and
   a second support plate over the adjustment plate compressing the adjustment plate within the second adjustment plate recess of the underside of the armrest platform.

5. The assembly of claim 1, further comprising at least two straps connected to the at least two of the mouse pad platform, the armrest platform, and the adjustment plate.

6. The assembly of claim 5, wherein each of the straps include hook and loop fasteners.

7. The assembly of claim 1, wherein the strap mounts include:
   a plurality of slots in the adjustment plate allowing for multiple strap positions in the adjustment plate;
   a first set of brackets attached to the underside of the mouse pad platform; and
   a second set of brackets attached to the underside of the armrest platform.

8. The assembly of claim 1,
   wherein the mouse pad platform is primarily formed from a wood product including a planar upper surface, side surfaces and the underside of the mouse pad platform, and
   wherein the armrest platform is primarily formed from the wood product including a planar upper surface, side surfaces and the underside of the mouse pad platform.

9. The assembly of claim 8, wherein the wood product is selected from a group consisting of:
  natural wood;
  plywood; and
  fiberboard comprising wood particles and a binding agent.

10. The assembly of claim 8, further comprising a laminate over at least a portion of the wood product, wherein the laminate forms the upper mouse pad platform surface.

11. The assembly of claim 8, wherein the planar upper surface, the side surfaces and the underside of the mouse pad platform form right angles relative to each other.

12. The assembly of claim 1, further comprising a wrist pad attached to an upper surface of the mouse pad platform.

13. An adjustable mouse pad and armrest kit comprising:
  a mouse pad platform forming an upper mouse pad platform surface suitable for operating a computer mouse;
  an armrest platform forming an upper armrest platform surface suitable for supporting a forearm of a user while operating the computer mouse;
  an adjustment plate configured to fixedly coupled to an underside of the mouse pad platform and an underside of the armrest platform, thereby connecting the mouse pad platform and the armrest platform; and
  strap mounts suitable to couple straps to at least two of the mouse pad platform, the armrest platform, and the adjustment plate;
  wherein the adjustment plate is selectively positionable along the underside of the mouse pad platform and selectively positionable along the underside of the armrest platform allowing adjustable spacing between the mouse pad platform and the armrest platform.

14. The kit of claim 13, wherein the adjustment plate defines an extruded profile including a planar central portion and wing portions on either side of the planar central portion.

15. The kit of claim 14,
  wherein the underside of the mouse pad platform forms a first adjustment plate recess mirroring the extruded profile facilitating the selective positioning of the adjustment plate along the underside of the mouse pad platform, and
  wherein the underside of the armrest platform forms a second adjustment plate recess mirroring the extruded profile facilitating the selective positioning of the adjustment plate along the underside of the armrest platform.

16. The kit of claim 13, further comprising at least two straps connected to the at least two of the mouse pad platform, the armrest platform, and the adjustment plate.

17. The kit of claim 13, wherein the strap mounts include:
  a plurality of slots in the adjustment plate allowing for multiple strap positions in the adjustment plate;
  a first set of brackets attached to the underside of the mouse pad platform; and
  a second set of brackets attached to the underside of the armrest platform.

18. The kit of claim 13,
  wherein the mouse pad platform is primarily formed from a wood product including a planar upper surface, side surfaces and the underside of the mouse pad platform, and
  wherein the armrest platform is primarily formed from the wood product including a planar upper surface, side surfaces and the underside of the mouse pad platform.

19. The kit of claim 18, wherein the upper surface, the side surfaces and the underside of the mouse pad platform form right angles relative to each other.

20. A method of installing an adjustable armrest mouse pad on an arm of a desk chair,
  wherein the adjustable armrest mouse pad includes:
    a mouse pad platform forming an upper mouse pad platform surface suitable for operating a computer mouse;
    an armrest platform forming an upper armrest platform surface suitable for supporting a forearm of a user while operating the computer mouse;
    an adjustment plate fixedly coupled to an underside of the mouse pad platform and an underside of the armrest platform, thereby connecting the mouse pad platform and the armrest platform;
    strap mounts on at least two of the mouse pad platform, the armrest platform, and the adjustment plate, the strap mounts being suitable to couple straps to the at least two of the mouse pad platform, the armrest platform, and the adjustment plate; and
    at least two straps,
    wherein the adjustment plate is selectively positionable along the underside of the mouse pad platform and selectively positionable along the underside of the armrest platform allowing adjustable spacing between the mouse pad platform and the armrest platform, the method including:
  selecting a preferred spacing between the mouse pad platform and the armrest platform;
  securing the adjustment plate to the mouse pad platform and the armrest platform with the preferred spacing between the mouse pad platform and the armrest platform;
  selecting strap mounts on at least two of the mouse pad platform, the armrest platform, and the adjustment plate;
  coupling the straps to the selected strap mounts on at least two of the mouse pad platform, the armrest platform, and the adjustment plate; and
  strapping the adjustable armrest mouse pad to the arm of the desk chair with the straps.

\* \* \* \* \*